June 4, 1929.  H. F. PITCAIRN  1,715,427
HELICOPTER DEVICE
Filed Dec. 12, 1925

INVENTOR
Harold F. Pitcairn
BY
Synnestvedt + Lechner
ATTORNEYS

Patented June 4, 1929.

1,715,427

UNITED STATES PATENT OFFICE.

HAROLD F. PITCAIRN, OF BRYN ATHYN, PENNSYLVANIA.

HELICOPTER DEVICE.

Application filed December 12, 1925. Serial No. 74,942.

This invention has for its primary object the provision of an improved aircraft mechanism such as is commonly termed a helicopter, in which I may utilize a couple of pairs of wings or planes which are preferably of rigid and cambered construction and pivotally attached to the supporting member at or near the center of rotation and driven by means of a power device which is applied to revolve the wings.

In machines of this general class certain difficulties are encountered, as, for example, differences in pressure and thrust upon a wing moving forwardly or in the general direction of the line of flight of the machine, as compared to a wing moving in the other direction, that is, in a general direction opposite to the line of flight.

One of the primary objects of my invention is the provision of a helicopter of the general class described but equipped to overcome or minimize the foregoing disadvantages. My improved method of mounting the wings also eliminates the gyroscopic effect, as well as creating a dynamic inertia.

Figure 1:
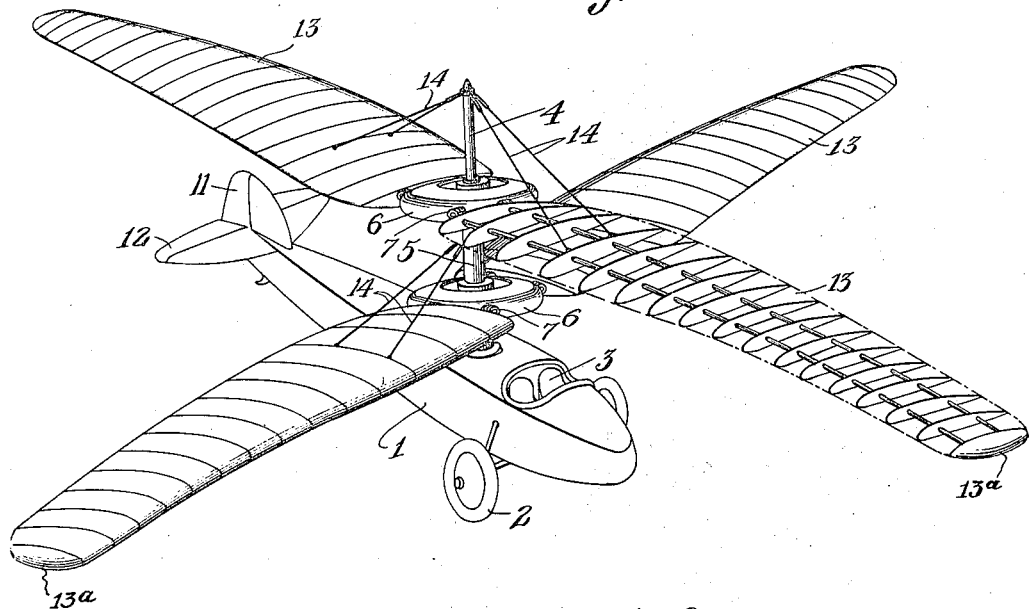
Figure 2:
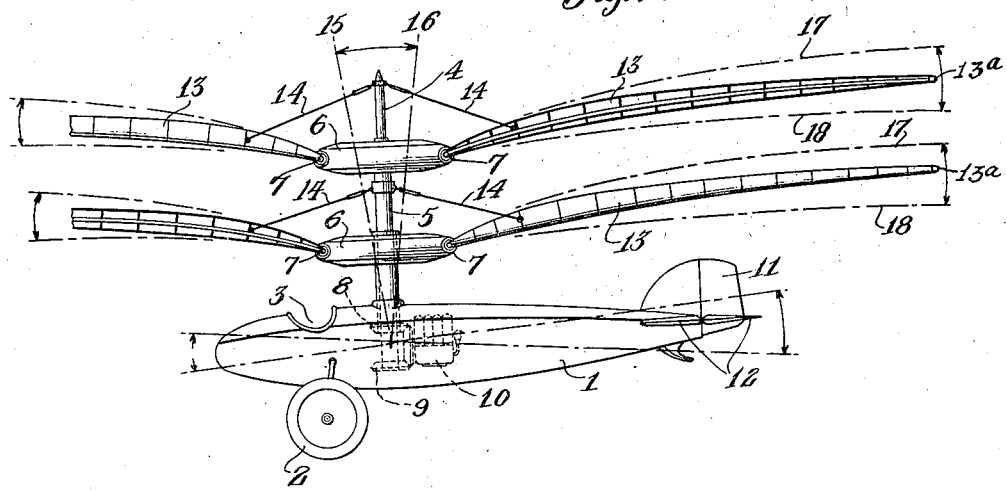

In order that my invention may be better understood, I will proceed to describe the same in connection with the accompanying drawing, in which Fig. 1 is a perspective view of an aircraft apparatus to which my improvemnet has been applied, and Fig. 2 is a side elevation of the same.

Referring more particularly to Fig. 1 it will be seen that I have therein indicated a fuselage 1, with wheels 2 of usual construction and a cockpit 3, with a couple of telescopically disposed revolving shafts 4 and 5 projecting upwardly. Each of the driving shafts 4 and 5 carries a hub member 6 to which the wings 13 are attached by hinge joints 7, an elastic cord 14 being arranged, as shown, to carry the wings and prevent their drooping too low when not rotating.

Referring more particularly to Fig. 2 the lower hub member 6 is driven by means of a bevelled gear 8 while the upper one is driven by a bevelled gear 9, both of these bevelled gears receiving their motion from the motor 10.

The rear of the fuselage is provided with rudder 11 and horizontally placed vanes 12 the latter serving the purpose of tilting the vertical shaft either toward the position marked 15 or 16, the effect of tilting it toward 15 being to cause a progressive forward movement of the device, while the reverse movement tends to check the speed of the device, as in landing.

It will be observed that in the rotative movement of the wings in my device, the parts will vary in position by virtue of the articulated connection with the hubs throughout a distance indicated diagrammatically by the lines 17 and 18 and the centrifugal action will tend to retain the sustaining vanes or wings in operative shape and compensate for the difference in sustaining effect on the air due to the change in movement, that is whether the rotative movement is toward the progressive movement of the device or opposite thereto.

To increase the dynamic inertia of the wings I may apply weights 13$^a$ at or near the wing-tips, as shown in Fig. 1.

I claim:—

1. A helicopter provided with an upright rotating shaft, a motor constructed to drive said shaft, wings, of substantially uniform chord throughout their length, pivotally secured in position to be driven by said shaft, and weights approximately at the wing tips to increase the dynamic inertia.

2. A helicopter provided with an upright rotating shaft, a motor adapted to drive said shaft, wings pivotally secured in position to be driven by said shaft, said wings being of a chord at their inner ends at least as great as their chord at their outer ends, and weights approximately at the wing tips to increase the dynamic inertia.

In testimony whereof, I have hereunto signed my name.

HAROLD F. PITCAIRN.